United States Patent [19]

Hamilton

[11] Patent Number: 4,629,262
[45] Date of Patent: Dec. 16, 1986

[54] POSITION SENSOR FOR MAGNETIC SUSPENSION AND POINTING SYSTEM

[75] Inventor: Brian J. Hamilton, Glendale, Ariz.

[73] Assignee: Sperry Corporation, New York, N.Y.

[21] Appl. No.: 747,627

[22] Filed: Jun. 24, 1985

[51] Int. Cl.[4] ............................................. F16C 39/06
[52] U.S. Cl. .................................................. 310/90.5
[58] Field of Search .......................... 308/10; 74/7.46; 318/632, 633; 361/143, 146

[56] References Cited

U.S. PATENT DOCUMENTS

| 3,508,444 | 4/1970 | Sitomer | 308/10 |
| 3,787,100 | 1/1974 | Habermann et al. | 308/10 |
| 4,078,436 | 3/1978 | Staats | 308/10 |
| 4,215,570 | 8/1980 | Eer Nisse | 310/338 |

FOREIGN PATENT DOCUMENTS 8400198 1/1984 World Int. Prop. O. ............. 308/10

OTHER PUBLICATIONS

Brian J. Hamilton, "Magnetic Suspension: The Next Generation in Precision Pointing", Jan. 30, 1982, American Astronautical Society, Paper No. AAS 82-034, pp. 8-9.

Primary Examiner—R. Skudy
Attorney, Agent, or Firm—Howard P. Terry; Arnold L. Albin

[57] ABSTRACT

An apparatus for providing a signal representative of armature displacement in a magnetic bearing assembly for a magnetic suspension system, of the type having a force sensor applied in a closed loop to provide a linear response with respect to an input force command signal. Signals representative of currents applied to the magnetizing coils and of the sensed force are used to derive the armature displacement signal. The signal so derived is applied to modulate the magnetic flux and obviates the need for proximity devices for sensing armature displacement. A circuit for generating the armature displacement signal is provided.

15 Claims, 4 Drawing Figures

POSITION SENSOR FOR MAGNETIC SUSPENSION AND POINTING SYSTEM

BACKGROUND OF THE INVENTION

1. Field of the Invention

The invention relates generally to magnetic suspensions for pointing instruments on a levitated member, movable in rotation about an axis or in linear translation. More particularly, the invention pertains to an electronic circuit configuration for determining the position of a suspension member with respect to associated electromagnetic actuators, for use in linearizing the applied deflection force.

2. Description of the Prior Art

Magnetic suspensions are particularly well adapted for substantially frictionless suspension of a movable member. Prior suspensions of this type utilizing magnetic bearing assemblies, in which it is desired to provide an output force linearly proportional to a commanded input force, require compensation for the non-linear nature of the magnetic circuit, since the force obtained is a nonlinear function of coil current and the air gap between the magnetizing coils and the moveable member. The resulting magnetic force F has been found to be of the form $$F = KI^2/g^2 \qquad (1)$$

where I is the current applied to an actuator coil, g is the air gap between a magnetically permeable core of the coil and the magnetic suspension member and K is a factor of proportionality. Since the magnetic actuator typically consists of two essentially identical magnetic circuits applying oppositely directed forces to a common rotor or armature, it may be shown that the square law current characteristic can be compensated by applying a fixed bias to the variable control current supplied to each coil. By sensing the position of the armature in the magnetic gap, the currents may be further modulated to negate the effects of the reciprocal gap-squared factor.

Thus prior suspension technology has required accurate measurements of both applied current and air gap between the armature and the coil. While precise current measurements are readily obtained, making an air gap measurement with the requisite linearity and resolution requires a precision sensor which is costly to fabricate and may result in reduced system reliability. A further disadvantage of the aforementioned apparatus is that equation (1) does not allow for the effects of magnetic hysteresis, flux leakage across the gap, and other magnetic anomalies. In consequence, magnetic actuators controlled in this way have at best achieved of the order of one or two percent linearity, even under controlled conditions. In Magnetic Suspension: The Next Generation in Precision Pointing, American Astronautical Society, Paper No. AAS 82-034, Jan. 30, 1982, the present inventor discussed an apparatus for correcting for such errors. By measuring the actual force applied to the magnetic bearing, as well as the magnitude of the air gap, and feeding the actual force signal in a closed loop to correct the force command signal, there is obtained improved performance with linearity of the order of one-tenth of one percent and compensation for the effects of the magnetic anomalies. However achieving an accurate air gap measurement requires a precision proximity transducer (proximeter). The present invention obviates the need for a precise measurement of the armature position in the gap when used in a force-loop system.

SUMMARY OF THE INVENTION

The invention is an improved magnetic suspension for applying a desired force to a magnetically permeable armature which is thereby positioned in a magnetic field formed by energizing a plurality of coils, whereat a measure of the applied airgap between the armature and coils is found by the magnitude of the force applied to the armature. A force sensor is coupled to the armature to develop a signal corresponding to the actual force, and the currents applied to the coils are also measured. By combining the force signal and the currents, a new signal is derived which corresponds to the magnitude of the air gap, and which is used to control the coil currents so that the actual force is linearly proportional to a force command signal.

DESCRIPTION OF THE PREFERRED EMBODIMENT

Figure 1:
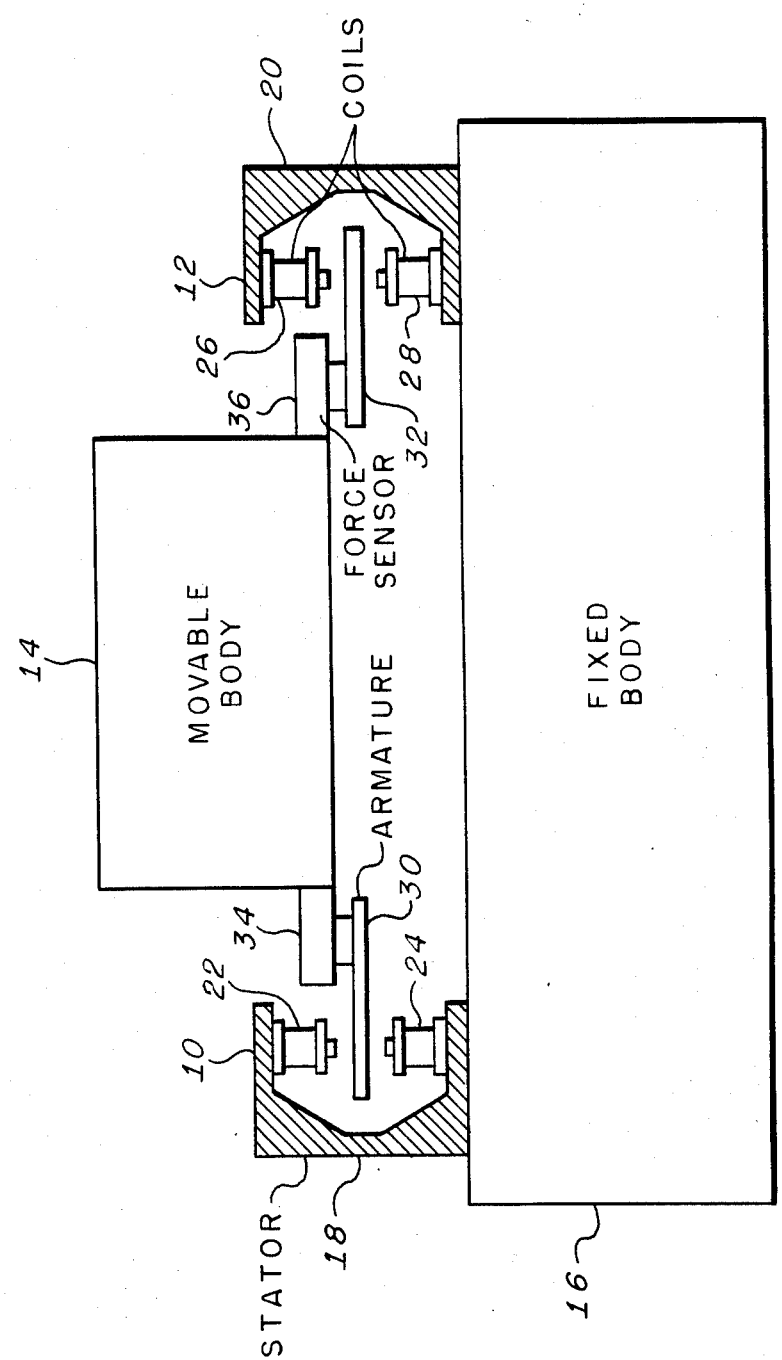
FIG. 1 is an elevation view showing the relationship of a fixed and movable body and associated magnetic suspension assembly.

Referring first to FIG. 1, a pair of magnetic bearing assemblies 10 and 12 is shown as supporting a moveable body 14 above a fixed body 16. Each magnetic bearing assembly is comprised of a stator 18 and 20 for supporting opposing coils for producing a magnetic flux when energized by an applied current. Armatures 30 and 32 are formed from a magnetically permeable material such as iron and disposed within an air gap between coils 22, 24 and 26, 28, respectively. When an electrical current is applied to the coils, a magnetic field is established which causes a predetermined force to be applied to the armatures. Since the armatures are fixed to the moveable body 14, the body is caused to be suspended with a predetermined air gap between the respective armature and its associated coils. By varying the applied currents, the resulting magnetic fields will cause the moveable body 14 to be levitated linearly or inclined angularly in accordance with the applied currents. Also shown in FIG. 1 are transducers 34 and 36, which are used to sense the magnetic force applied to the moveable body 14, in a manner to be described.

Figure 2:
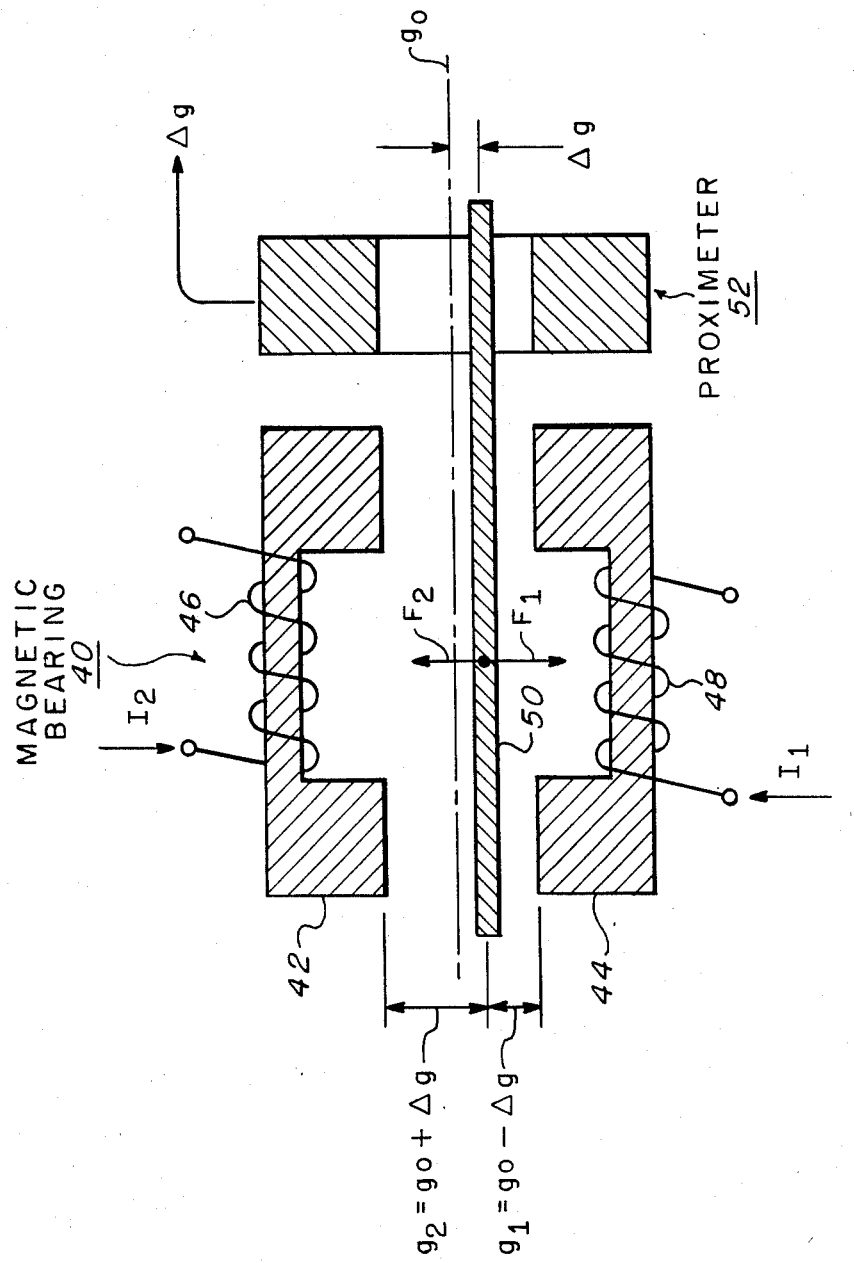
FIG. 2 is a conceptual view in cross section of a magnetic bearing assembly of the prior art.

Referring now to FIG. 2, a magnetic bearing assembly 40 of the prior art for use with a magnetic suspension is shown in cross section. Each magnetic bearing assembly 40 includes electromagnets 42 and 44, comprised of a magnetic core and associated coil 46 and 48. An armature or rotor plate 50 of magnetic material is disposed between the faces of the electromagnets 42 and 44. The electromagnets apply opposing forces to the rotor 50. When a signal current $I_1$ is applied to coil 48, the rotor is attracted in the direction of electromagnet 44. Conversely, when a signal current $I_2$ is applied to coil 46 of electromagnet 42 the rotor is attracted in the direction of electromagnet 42. A proximity transducer 52 is included with each magnetic bearing assembly 40 to produce a signal that is proportional to the distance $\Delta g$ from the position of the displaced rotor 50 to a predetermined reference point $g_O$ in the plane of the rotor neutral position. The proximiter may be a conventional eddy-current pick-off device, the signal output of which is proportional in magnitude and sense to any change in the gap length from the predetermined value, this signal being processed and amplified so as to produce a current proportional to a change in the airgap. These signals are used for compensating for the inherent nonlinearity of magnetic flux resulting from an applied current in the magnetic bearings. It will be shown that the proximiter signal may be used to modulate the electromagnetic flux so as to linearize the resulting force applied to the rotor 50.

Figure 3:
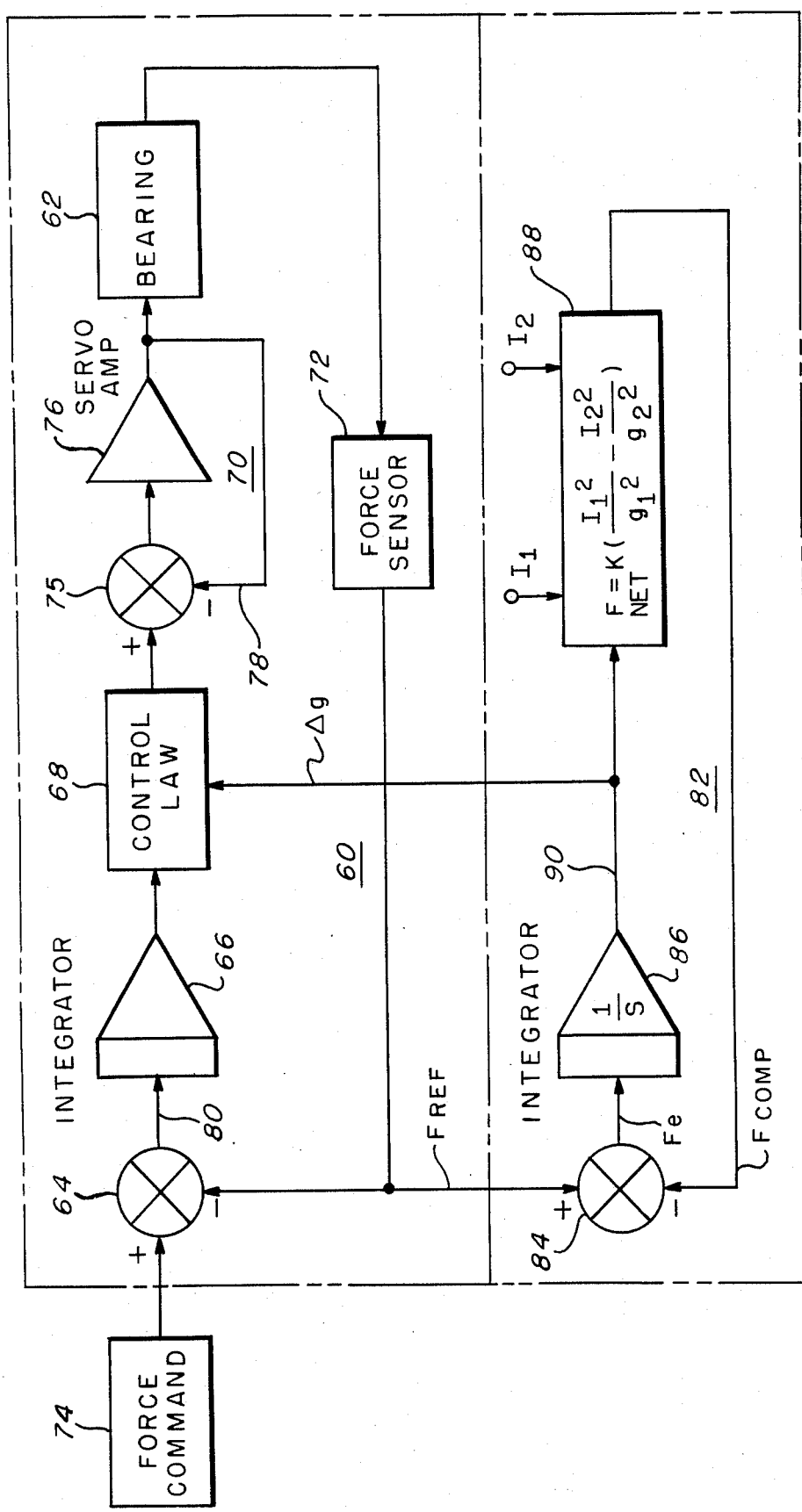
FIG. 3 is an electrical schematic diagram of the electronic controls for a magnetic suspension including the force sensor and air gap estimating features of the present invention.

Referring now to FIG. 3, there is shown a block diagram of a circuit suitable for controlling a magnetic bearing assembly 62. The circuit of FIG. 3 represents the elements necessary to control a single magnetic bearing assembly. Like circuits will be provided for each magnetic bearing assembly, of which normally a plurality will be provided.

The primary components for controlling the force applied to the rotor are a summing junction 64, integrator and gain 66 and control law network 68, a servo amplifier loop 70, a magnetic bearing assembly 62, and a force sensor 72. A force command signal 74 is applied to an input terminal of summing junction 64 and processed through conventional integrator and gain 66. The integrated signal is then applied to control law 68, whose function is to linearize the applied magnetic force field with respect to the force command 74.

As described above with respect to equation (1) it is known in the art that the use of a magnetic bearing as a linear force actuator requires that the response be modified in accordance with a control law to compensate for the nonlinear nature of the magnetic circuit. Since the magnetic actuator consists of two magnetic circuits applying oppositely directed forces to a common rotor, the current-squared term $I^2$ can be corrected by applying a bias current to each circuit to which a control current is added on one side and subtracted on the other side, which will result in a net force proportional to the control current. Similarly, the currents can be modulated by applying positive and negative current increments corresponding to the air gap between the rotor and its respective electromagnet. When the rotor moves in the magnetic gap, the currents will be modulated to compensate for the effects of the inverse gap-squared law. The resulting control law is of the form $$I_1 = I_0 \left[ 1 + \frac{F}{F_{MAX}} \right] \left[ 1 - \frac{\Delta g}{g_0} \right] \quad (2)$$

$$I_2 = I_0 \left[ 1 - \frac{F}{F_{MAX}} \right] \left[ 1 + \frac{\Delta g}{g_0} \right]$$

where $I_O$ is the bias current, $\Delta g$ is the displacement of the rotor from the gap center $g_O$, F is the applied force, and $F_{MAX}$ is the maximum design force for the magnetic bearing assembly. The applied currents $I_1$ and $I_2$ may be readily measured by conventional current sampling devices, while the gap signal $\Delta g$ has heretofore been provided by the proximeter 52 as shown in FIG. 2. The servo loop 70 is comprised of a summing network 75, servo amplifier 76 and feedback path 78. The loop is closed to insure that the current in the coils is correctly calibrated despite variations in coil parameters with temperature, and also to reduce the lag in response that results from the large inductance of the coil. The output of servo amplifier 76 is used to energize an electromagnet of magnetic bearing assembly 62.

While the control law 68 compensates to a high degree for the nonlinear magnetic field response, errors in the measurement of the gap value with respect to the actual gap will result in a force error. Further errors exist within the magnetic circuit itself since an ideal circuit was assumed in deriving the simple equations of (2). The solution that has been found effective is to measure the actual force applied by the magnetic bearing and feed back a proportional signal to the system input, thus closing the force loop 60. This approach eliminates the need for precise calibration, hysteresis corrections, etc. For this purpose, the force sensor 72 is mechanically coupled to bearing assembly 62 and provides an electrical output proportional to the applied force. The output of force sensor 72 is coupled to summing network 64 in a polarity opposing that of the input force command 74 so that a force error signal 80 representing the difference between the commanded force signal and the sensed force is used to drive integrator 66. Force sensor 72 must be highly linear and stable, have low hysteresis, fast response time, and extremely high resolution. It must be capable of operating in severe environments including a wide range of temperatures and pressures and avoid introducing a resonance in the force loop feedback circuit. One suitable device is a quartz resonator transducer, as described by E. P. Eer Nisse in U.S. Pat. No. ,4,215,570, Minature Quartz Resonator Force Transducer, issued Aug. 5, 1980, which is hereby incorporated by reference.

The remaining circuit elements in force loop 60 are conventional.

A disadvantage of the prior art system, as described with respect to FIG. 2, which utilizes both a force sensor and a sensor, is the reduced reliability and added expense of providing a multiplicity of proximity sensors. Since simulation studies indicated that under closed loop conditions position errors as high as five percent could be tolerated, an alternate approach which obviated the need for a proximity transducer was sought. Desirably, the present invention permits deriving the armature displacement position from a knowledge of the parameters of applied current and resultant force, thus avoiding the need for the proximity transducer of the prior art. The present invention permits the replacement of the proximity transducer by a simple electrical circuit which will provide the required signal indicative of the armature gap to control law 68.

From the force equation (1), the net force resulting from the application of control current to two opposing electromagnets may be shown to be:

$$F_{NET} = K \left[ \frac{I_1^2}{(g_0 - \Delta g)^2} \right] - \left[ \frac{I_2^2}{(g_0 + \Delta g)^2} \right] \quad (3)$$

which relates the four variables $F_{NET}$, $I_1$, $I_2$, and $\Delta g$, wherein $F_{NET}$ is the resulting applied force, $I_1$ and $I_2$ are the currents applied to the electromagnets, $\Delta g$ is the change in the armature gap from the original position $g_O$, and K is a factor of proportionality. Since $F_{NET}$, $I_1$, $I_2$ and $g_O$ are easily measured and therefore precisely known, the fourth variable $\Delta g$ can be computed. Thus, an exact value of $\Delta g$ may be determined without a need for physical measurement of the value.

While equation (3) is theoretically capable of solution, in practice it involves taking the roots of a fourth order polynomial, which is not readily accomplished with analog electronics. However, feedback loop 82 of FIG. 3 provides a means for estimating the value of $\Delta g$ and by successive approximation returning an exact value of $\Delta g$ to control law 68.

Referring now to loop 82 of FIG. 3, the measured force signal $F_{REF}$ which is representative of the force applied to the suspension is applied to a first input of summing junction 84 which may be comprised of a differential operational amplifier. The output signal $F_e$ is a force error signal representative of the difference between the measured force $F_{REF}$ and a computed force value $F_{COMP}$, and is applied to integrator 86. Integrator 86 serves to reduce steady state errors in the feedback loop. If a steady error signal $F_e$ persists, the output of the integrator will be continously increasing with time. This signal will drive control law 88 in a direction so as to reduce the error, and the integrator output will stop increasing only when the error signal is zero, after which the integrator will supply the necessary steady-state signal to maintain the desired magnetic field. Control law 88 may be comprised of a divider/multiplier which is caused to solve the following equation:

$$F_{NET} = K \left[ \frac{I_1^2}{g_1^2} - \frac{I_2^2}{g_2^2} \right] \tag{4}$$

The computed force output $F_{COMP}$ is applied to a second input of summing junction 84. Since the air gaps $g_1$ and $g_2$ may be expressed in terms of a reference position $g_O$ and a variable armature gap displacement $\Delta g$ as shown in FIG. 2 and equation (3), equation (4) may be used indirectly to solve for the value of $\Delta g$, and hence determine the true gap position.

Since the force error signal $F_e$ is applied to the integrator 86, the output signal on lead 90 is dependent on the force error. By appropriately configuring integrator 86, the signal on lead 90 may be made a measure of the armature displacement and hence of the true air gap change $\Delta g$. The computed force magnitude $F_{COMP}$ may be seen as directly affecting the value of $\Delta g$ on line 90 in the sense that increasing the force error will cause the integrator to charge in a direction so as to increase or decrease $\Delta g$ so as to reduce the force error $F_e$ to zero. The integrator transfer function may be expressed in terms of the Laplacian operator as 1/S. Integrator 86 possesses extremely high gain at low frequencies and hence will generate whatever $\Delta g$ signal is necessary to drive the force error to zero. The output $\Delta g$ is then applied to control law 68, where it is used to compute the required magnet control currents corresponding to the applied force command 74.

Figure 4:
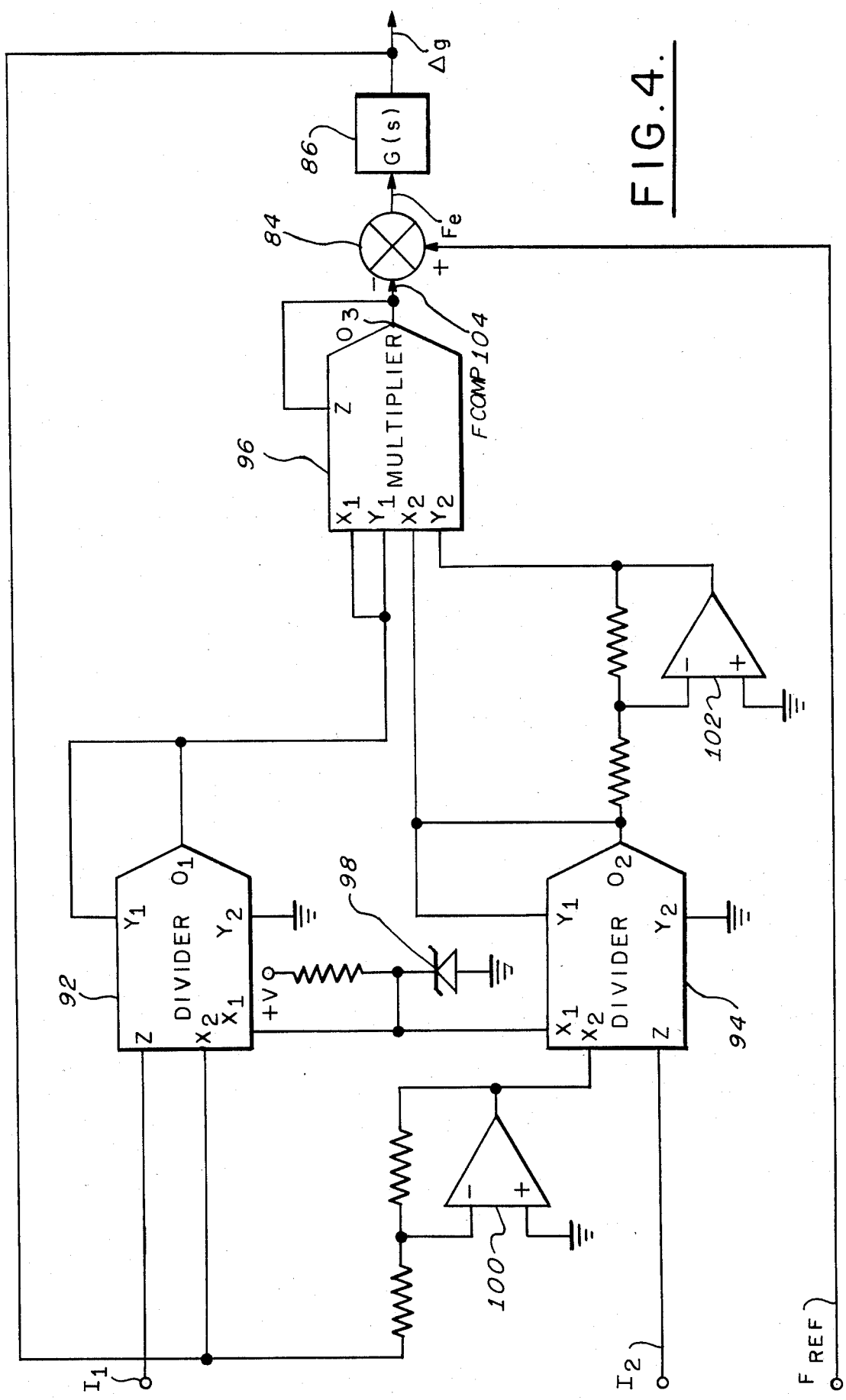
FIG. 4 is an electrical schematic diagram of an analog divider/multiplier circuit for use in the gap estimating circuit of the present invention.

Referring now to FIG. 4, there is shown schematically a suitable electronic system for implementing the divider/multiplier 88 of FIG. 3. The primary components for accomplishing this are nonlinear elements 92 and 94, configured in the form of a divider, and nonlinear element 96 configured in the form of a multiplier.

Equation (3) can be rewritten in the form of:

$$F_{NET} = K \left[ \frac{I_1}{g_O - \Delta g} + \frac{I_2}{g_O + \Delta g} \right] \left[ \frac{I_1}{g_O - \Delta g} - \frac{I_2}{g_O + \Delta g} \right] \tag{5}$$

This equation is in the form of the difference of two squares as shown in equation (6) below:

$$(A+B)(A-B) \tag{6}$$

The product term can be implemented with a generic nonlinear device such as shown at multiplier 96, whose output an algebraic product the form:

$$(X_1-X_2)(Y_1-Y_2) \tag{7}$$

Dividers 92 and 94 perform an algebraic division which is of the form:

$$Z/(X_1-X_2) \tag{8}$$

For algebraic divider 92, $X_1$ is a constant voltage provided by Zener diode 98 scaled to represent $g_O$ and $X_2$ is the computed value of $\Delta g$, thus making the denominator of equation (8) ($g_O - \Delta g$). Input $I_1$ to terminal Z represents the current applied to one coil of the magnetic bearing assembly. The signal $\Delta g$ is also coupled to one input of operational amplifier 100, wired to perform an inversion function. For algebraic 94, $X_1$ is again obtained from Zener diode 98, and the value of Z is found from the applied current $I_2$, representative of the current applied to an opposing coil of the magnetic bearing assembly. The signal applied to $X_2$ is the inverted output of signal $\Delta g$. Thus, it may be seen that the output of divider 92 is of the form (9) and the output of divider 94 is of the form (10).

$$O_1 = I_1/(g_O - \Delta g) \tag{9}$$

$$O_2 = I_2/(g_O + \Delta g) \tag{10}$$

Output $O_1$ of divider 92 is coupled to inputs $X_1$ and $Y_1$ of multiplier 96. Output $O_2$ of divider 94 is coupled to input $X_2$ of multiplier 96 and also inverted by inverter 102 to provide an input to terminal $Y_2$ of multiplier 96. Thus, the output $O_3$ of multiplier 96 at input 104 to summing junction 84 is the product of the sum and differences of equations (9) and (10) resulting in the solution of equation (5).

Dividers 92 and 94 and multiplier 96 may be obtained by appropriately configuring an integrated circuit such as the AD 532, as manufactured by Analog Devices Inc., Norwood MA 02062. Summing junctions 64, 75, and 84 and inverters 100 and 102. configured operational amplifiers. Integrator 866 may be configured by using a filter circuit and high gain operational amplifiers in a conventional manner.

While the apparatus for computing the armature displacement signal is shown as analog for illustrative purposes, it may also be implemented in digital form using conventional analog-to-digital and digital-to-analog converters or a programmable microprocessor.

In operation, referring again to FIG. 3, a force command signal 74 is applied through summing junction 64 to integrator 66 where it is modified by control law 68 to provide a linear magnetic output with respect to applied currents. The signal from control law 68 is applied through servo amplifier loop 70 to actuate an electromagnet (not shown) in magnetic bearing assembly 62. A force sensor 72 coupled to the magnetic bearing assembly 62 provides an output signal $F_{REF}$ proportional to the magnitude of the resultant force, which is returned to summing junction 64 to derive a command error signal 80 representing the difference between the commanded force and the resulting applied force. Control law 68 requires an input $\Delta g$ representative of the air gap between an electromagnet and the armature, which is provided by feedback loop 82 from lead 90. The signal from the force sensor 72 is also applied to summing junction 84 and coupled to integrator 86. Integrator 86 provides a ramped output. So long as there is an input signal provided, the output will continue to increase or decrease depending on the algebraic sign of the input. When the input is zero, the output will stay fixed at the previously established value. The integrator output on lead 90 is applied to control law 88 in combination with signals $I_1$ and $I_2$ representing currents applied to opposing electromagnets. The output $F_{COMP}$ is a computed force magnitude which is subtracted from the sensed force magnitude $F_{REF}$ in junction 84 to provide a force error signal $F_3$ to integrator 86. If the computed value of force differs from the sensed forced magnitude, then an error will be generated which will cause the output of integrator 86 to change in a direction either increasing or decreasing the signal at lead 90 to urge the resulting force error to zero. In the steady state, the computed force will equal the sensed force, which is a necessary and sufficient condition for the output signal $\Delta g$ of integrator 86 to be a measure of the true gap change. The signal $\Delta g$ is then provided, to control law 68 to complete the circuit operation. Since the gap position is implicitly determined from the known parameters, it need not itself be measured. Thus, advantageously, a conventional proximeter need not be provided, which results in reduced costs and increased reliability.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In a magnetic bearing system for applying a predetermined force to an armature positioned for suspension in a magnetic field, of the type having a plurality of opposing coils energized by at least first and second currents for generating the magnetic field and spaced apart from the armature by an air gap, the suspension having means coupled to the armature for deriving a signal representative of an applied force, means for deriving signals representative of the first and second currents, and means for deriving a signal representative of the magnitude of the air gap, the improvement comprising:
    means responsive to said applied force signal and said current signals for deriving said signal representative of the magnitude of said air gap.

2. The apparatus as set forth in claim 1 in which said means for deriving an air gap signal comprises circuit means for providing an output signal in accordance with the expression $$F_{NET} = K(I_1^2/g_1^2 - I_2^2/g_2^2)$$

wherein:
    $F_{NET}$ is a computed force in Newtons
    $I_1$ is a first applied current in Amperes,
    $I_2$ is a second applied current in Amperes,
    $g_1$ is a first air gap correspoding to a first coil, in meters,
    $g_2$ is a second air gap corresponding to a second coil, in meters, and
    K is a predetermined constant in Newton-meters$^2$/Amperes$^2$.

3. The apparatus as set forth in claim 2 wherein said means for deriving an air gap signal further comprises means for deriving a force error signal by forming an algebraic difference of said applied force signal and a computed force signal derived in accordance with said expression.

4. The apparatus as set forth in claim 3, further comprising first integrator means for supplying a ramped force error signal proportional to the magnitude and time duration of said force error signal to said circuit means.

5. The apparatus as set forth in claim 4, further comprising:
    means for amplifying said ramped force error signal, and
    feedback means for applying said amplified signal to said circuit means in a closed loop so as to drive said force error signal to zero and provide a resultant signal representative of the deflection of said armature in said air gap.

6. The apparatus as set forth in claim 5, further comprising:
    (a) first algebraic divider means, responsive to said signal representative of said first current and to air gap signals, having a numerator corresponding to said first current and a denominator corresponding to a difference between a signal representative of a predetermined air gap and said armature deflection signal,
    (b) inverter means, responsive to said air gap signals for providing inverted air gap signals,
    (c) second algebraic divider means, responsive to said signal representative of said second current and to said inverter air gap signals, having a numerator corresponding to said second current and a denominator corresponding to differences between said signal representative of a predetermined air gap and said inverted signals,
    (d) means for receiving a signal corresponding to the quotient of said second algebraic divider means and for inverting said signal,
    (e) algebraic multiplier means coupled to receive a first signal corresponding to the quotient of said first algebraic divider means, a second signal corresponding to said quotient of said second algebraic divider means, and a third signal corresponding to said inverted quotient of said second algebraic divider means, and for providing a signal representative of sums and products thereof, thereby forming said derived force signal, and
    (f) means for coupling said derived force signal to said means for deriving a force error signal.

7. The apparatus as set forth in claim 6, further comprising:
 (a) means for applying a command signal representative of said predetermined force to be applied to said armature,
 (b) means for applying said armature deflection signal,
 (c) means for applying said applied force signal,
 (d) means responsive to said command signal, said armature deflection signal, and said applied force signal for generating said first and second currents, and
 (e) means for applying said first and second currents respectively to opposing ones of said coils.

8. The apparatus as set forth in claim 7, wherein said means for applying a command signal includes means for combining said command signal and said applied force signal to obtain a command error signal representative of an algebraic difference thereof for varying the magnitude of said applied currents.

9. The apparatus as set forth in claim 8, further comprising second integrator means responsive to the magnitude and duration of said command error signal for applying a ramped command error signal for controlling said first and second currents.

10. The apparatus as set forth in claim 9, further comprising means for applying said armature deflection signal to modify said first and second coil currents so that said applied force is linearly proportional to a command signal representative of said predetermined force.

11. The apparatus as set forth in claim 10, wherein said means for modifying said first and second currents includes control law means responsive to said second integrator means and said armature deflection signal for generating said force substantially linearly related to said command signal.

12. The apparatus as set forth in claim 11, wherein said means for deriving said applied force signal comprises a force transducer coupled to said suspension.

13. The apparatus as set forth in claim 12, wherein said force transducer is of the piezo-electric type.

14. The apparatus as set forth in claim 12, said transducer further comprising a resonant quartz crystal having a frequency of vibration proportional to an applied force and providing an output signal correspoding to said frequency.

15. In a magnetic bearing system for applying a predetermined force to an armature positioned for suspension in a magnetic field, of the type having a plurality of opposing coils energized by at least first and second currents for generating the magnetic field and spaced apart from the armature by an air gap, the suspension having means coupled to the armature for deriving a signal representative of an applied force, means for deriving signals representative of the first and second currents, and means for deriving a signal representative of the magnitude of the air gap, the method wherein said means for providing a signal representative of the magnitude of the airgap comprises the steps of:
 providing a computed force signal proportional to fractional differences of said first and second currents and inversely proportional to fractional differences of air gap of said armature,
 combining said signal proportional to fractional differences and said signal representative of an applied force to derive an algebraic difference signal thereof,
 applying said difference signal to said signal proportional to fractional differences in a closed loop, and sensing when said algebraic difference is zero.

* * * * *